United States Patent
Patel

(10) Patent No.: US 12,432,189 B2
(45) Date of Patent: *Sep. 30, 2025

(54) PROVIDING OUTCOME EXPLANATION FOR ALGORITHMIC DECISIONS

(71) Applicant: Jumio Corporation, Palo Alto, CA (US)

(72) Inventor: Labhesh Patel, Santa Clara, CA (US)

(73) Assignee: Jumio Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,421

(22) Filed: Mar. 22, 2024

(65) Prior Publication Data

US 2025/0023856 A1    Jan. 16, 2025

Related U.S. Application Data

(63) Continuation of application No. 17/223,892, filed on Apr. 6, 2021, now Pat. No. 11,968,194, which is a
(Continued)

(51) Int. Cl.
*H04L 9/40*      (2022.01)
*G06F 21/32*      (2013.01)
(Continued)

(52) U.S. Cl.
CPC ............ *H04L 63/08* (2013.01); *G06N 5/04* (2013.01); *G06N 20/00* (2019.01)

(58) Field of Classification Search
CPC .......... H04L 9/40; H04L 63/08; G06F 21/32; G06N 20/00; G06N 5/04
See application file for complete search history.

(56) References Cited

U.S. PATENT DOCUMENTS

| | | | |
|---|---|---|---|
| 10,043,071 B1* | 8/2018 | Wu | G06V 30/413 |
| 2014/0162598 A1* | 6/2014 | Villa-Real | G07F 7/0886 |
| | | | 455/411 |
| 2018/0107887 A1* | 4/2018 | Huber, Jr. | G06V 30/412 |

FOREIGN PATENT DOCUMENTS

| | | | |
|---|---|---|---|
| CA | 2749232 A1 | 3/2001 | |
| CN | 104469767 B | * 12/2017 | H04L 63/08 |

OTHER PUBLICATIONS

Jumio Corporation, International Search Report and Written Opinion, PCT/US2020/017151, May 4, 2020, 13 pgs.
(Continued)

*Primary Examiner* — Jayesh M Jhaveri
(74) *Attorney, Agent, or Firm* — Patent Law Works LLP; Reena Kuyper

(57) ABSTRACT

Computer systems and methods are provided for training a machine learning system to determine an authentication decision and explanation information corresponding to the authentication decision. First authentication information for a first authentication request including a first image is received. First validation information corresponding to the first image and including a first authentication decision and first explanation information is received. Data storage of a machine learning system stores the first image and the first validation information. The machine learning system updates an authentication model based on the stored first image and first validation information. Second authentication information for a second authentication request is received. The machine learning system determines second validation information, including second explanation information, based on the updated authentication model. The second explanation information is provided for display to a user device.

20 Claims, 13 Drawing Sheets

Related U.S. Application Data continuation of application No. PCT/US2020/017151, filed on Feb. 7, 2020.

(60) Provisional application No. 62/809,428, filed on Feb. 22, 2019.

(51) Int. Cl.
*G06N 5/04* (2023.01)
*G06N 20/00* (2019.01)

(56) References Cited

OTHER PUBLICATIONS

Jumio Corporation, Communication Pursuant to Article 94(3), EP20710365.6, Apr. 12, 2023, 6 pgs.
Johnatan S. Olivieira et al., "Cross-Domain Deep Face Matching for Real Banking Security Systems," arxiv.org, Cornell University Library, 201 Olin Library Cornell Univesity, Ithaca, NY 14853, Jun. 20, 2018, XPO81641261, 8 pgs.
Patel, Office Action, U.S. Appl. No. 17/223,892, Aug. 31, 2023, 13 pgs.
Patel, Notice of Allowance, U.S. Appl. No. 17/223,892, Jan. 12, 2024, 6 pgs.

\* cited by examiner

| Validation Information 128 |
|---|
| Auth Request 1 1002a |
| Image 1004a \| Decision 1006a \| Reason 1008a |
| Auth Request 2 1002b |
| Image 1004b \| Decision 1006b \| Reason 1008b |
| ⋮ |
| Auth Request N 1002N |
| Image 1004N \| Decision 1006N \| Reason 1008N |

Figure 10A

| Reason Codes 1008 | |
|---|---|
| Digital Copy | 01 |
| Manipulated Image | 02 |
| Cloned Image | 03 |
| Spliced Image | 04 |
| Inserted Text | 05 |
| Missing Text | 06 |
| Punched Document | 07 |
| Data Masking | 08 |
| Layout Irregularity | 09 |
| Not a Match | 10 |

Figure 10B

| Auth Request 1 1002a | | |
|---|---|---|
| Image 1004a | Decision 1006a<br>Invalid | Reason 1008a<br>02 |
| Auth Request 2 1002b | | |
| Image 1004b | Decision 1006b<br>Invalid | Reason 1008b<br>07 |
| Auth Request 3 1002c | | |
| Image 1004c | Decision 1006c<br>Invalid | Reason 1008c<br>01 |

Figure 10C

```
┌─────────────────────────────────────┐
│ Validation Information 128          │
│  ┌───────────────────────────────┐  │
│  │ Auth Request 1 1202a          │  │
│  │  ┌──────────┬──────────────┐  │  │
│  │  │ Image    │ Decision     │  │  │
│  │  │ 1204a    │ 1206a        │  │  │
│  │  └──────────┴──────────────┘  │  │
│  │ Auth Request 2 1202b          │  │
│  │  ┌──────────┬──────────────┐  │  │
│  │  │ Image    │ Decision     │  │  │
│  │  │ 1204b    │ 1206b        │  │  │
│  │  └──────────┴──────────────┘  │  │
│  │            ⋮                  │  │
│  │ Auth Request N 1202N          │  │
│  │  ┌──────────┬──────────────┐  │  │
│  │  │ Image    │ Decision     │  │  │
│  │  │ 1204N    │ 1206N        │  │  │
│  │  └──────────┴──────────────┘  │  │
│  └───────────────────────────────┘  │
└─────────────────────────────────────┘
```

Figure 12A

```
┌──────────────────────────────────────────────┐
│ Auth Request 1 1202a                         │
│  ┌──────────────────────┬─────────────────┐  │
│  │ Image 1204a          │ Decision 1206a  │  │
│  │                      │                 │  │
│  │   [image]            │    Invalid      │  │
│  └──────────────────────┴─────────────────┘  │
└──────────────────────────────────────────────┘
           ↑ 1210

┌──────────────────────────────────────────────┐
│ Auth Request M 1202M                         │
│  ┌──────────────────────┬─────────────────┐  │
│  │ Image 1204M          │ Decision 1206M  │  │
│  │                      │                 │  │
│  │   [image]            │    Valid        │  │
│  └──────────────────────┴─────────────────┘  │
└──────────────────────────────────────────────┘
           ↑ 1210
```

Figure 12B

PROVIDING OUTCOME EXPLANATION FOR ALGORITHMIC DECISIONS

PRIORITY APPLICATIONS

This application is a continuation of U.S. application Ser. No. 17/223,892, filed Apr. 6, 2021, which is a continuation of International App. PCT/US20/17151, filed Feb. 7, 2020, which claims priority to U.S. Prov. App. 62/809,428, filed Feb. 22, 2019; each of which is hereby incorporated by reference in its entirety.

TECHNICAL FIELD

This application relates generally to user authentication, and more particularly, to authentication using machine learning to generate algorithms for analyzing image data.

BACKGROUND

Identification and verification of remote users is important for many network communications and transactions. This is especially true with sensitive communications and important transactions when users are unacquainted and remote from each other. Traditionally, a person presents a physical identification document for inspection by an agent who compares a facial image of the identification document to the physical appearance of the person. However, the conventional mechanisms of identifying and verifying users are inconvenient and inefficient, and result in burdens for users.

Recently enacted privacy regulations require a user to be given a choice not to be subject to a completely automated workflow, unless the user can be provided with an explanation regarding the outcome of the automated workflow. For example, if an automated system decides whether a user's physical identification document is invalid for a particular transaction, the system would need to provide an explanation to the user explaining why the user's identification document was determined to be invalid. However, conventional mechanisms of identifying and verifying users often require human intervention when it comes to providing intelligible explanations to the user, which is inefficient, and results in burdens for automation providers.

SUMMARY

Accordingly, there is a need for systems and/or devices with more efficient, accurate, and intuitive methods for training a machine learning authentication model to not only analyze an image for authentication of a user, but also to provide the user with an explanation of the corresponding authentication decision. Such systems, devices, and methods optionally complement or replace conventional systems, devices, and methods for analyzing an image for authentication of the user.

In some embodiments, a machine learning system is used to generate a model that is used for analyzing image data. The image data includes, for example, an image of an identification document (e.g., an identification document, such as a passport or other government-issued document, that includes an image of a user) and/or an image captured of the user (e.g., a recent "selfie" image of the user). A computing system that implements machine learning analyzes a set of training data that include image data (e.g., image data included in a large number of authentication requests). The machine learning system is used to generate a model that can be used for analysis of incoming authentication requests. In some embodiments, a supervised training module of the machine learning system trains an authentication model using human tagged data (e.g., by iteratively classifying the data, comparing test data against human tags, and performing optimization to minimize classification error). In some embodiments, an unsupervised training module of the machine learning system trains an authentication model without using human input for classification (e.g., by encoding and clustering data to find potential groups and outliers). In some embodiments, the results of applying an authentication model (e.g., trained by supervised learning and/or unsupervised learning) to a set of authentication request data is compared against the results of human review of the same set of authentication request data, and discrepancies between the machine learning results and the human review results are used to alter the authentication model. In some embodiments, the model is trained by providing images as inputs, and by providing respective authentication decisions (e.g., fraud, not fraud) and reasons (e.g., manipulated image, spliced image, missing text) as input labels corresponding to respective image inputs. As a result, the trained model outputs not only the authentication decision, but also the reason for that decision, allowing for the user to receive the explanation at substantially the same time as the decision is received.

The disclosed subject matter includes, in one aspect, a computerized method for receiving first authentication information for a first authentication request, wherein the first authentication information includes a first image that corresponds to a first identification document; receiving, from a validation system, first validation information corresponding to the first image, wherein the first validation information includes (i) a first authentication decision associated with the first image and (ii) first explanation information corresponding to the first authentication decision; storing, by data storage of a machine learning system, the first image and the first validation information corresponding to the first image; and updating an authentication model of the machine learning system based on the stored first image and the stored first validation information corresponding to the first image; receiving second authentication information for a second authentication request, wherein the second authentication information includes a second image that corresponds to a second identification document; determining, using the updated authentication model of the machine learning system, second validation information corresponding to the second image, wherein the second validation information includes (i) a second authentication decision associated with the second image and (ii) second explanation information corresponding to the second authentication decision; and providing for display to a user device the second explanation information corresponding to the second authentication decision. It is important to note that while the method above is described with regard to one first image and one second image, the method is implementable with (i) two or more first images (e.g., the machine learning system updates the authentication model based on a plurality of images and their associated validation decisions and explanations), and/or (ii) two or more second images (e.g., the machine learning system uses the updated authentication model to determine authentication decisions and explanations for a plurality of images received subsequent to one or more of the first images and/or subsequent to an authentication model update).

In some embodiments, a computer readable storage medium stores one or more programs. The one or more programs comprise instructions, which, when executed, cause a device to implement one or more of the operations described above. In some embodiments, a system includes one or more processors, memory, and one or more programs. The one or more programs are stored in the memory and configured to be executed by the one or more processors. The one or more programs include instructions for implementing one or more of the operations described above.

BRIEF DESCRIPTION OF THE DRAWINGS

So that the present disclosure can be understood in greater detail, features of various embodiments are illustrated in the appended drawings. The appended drawings, however, merely illustrate pertinent features of the present disclosure and are therefore not limiting.

FIGS. 10A-10C are diagrams illustrating details of the validation information of FIG. 1, in accordance with some embodiments.

FIGS. 12A-12B are diagrams illustrating details of the validation information of FIG. 1, in accordance with some embodiments.

In accordance with common practice, some of the drawings may not depict all of the components of a given system, method, or device. Finally, like reference numerals denote like features throughout the specification and figures.

DETAILED DESCRIPTION

Figure 1:
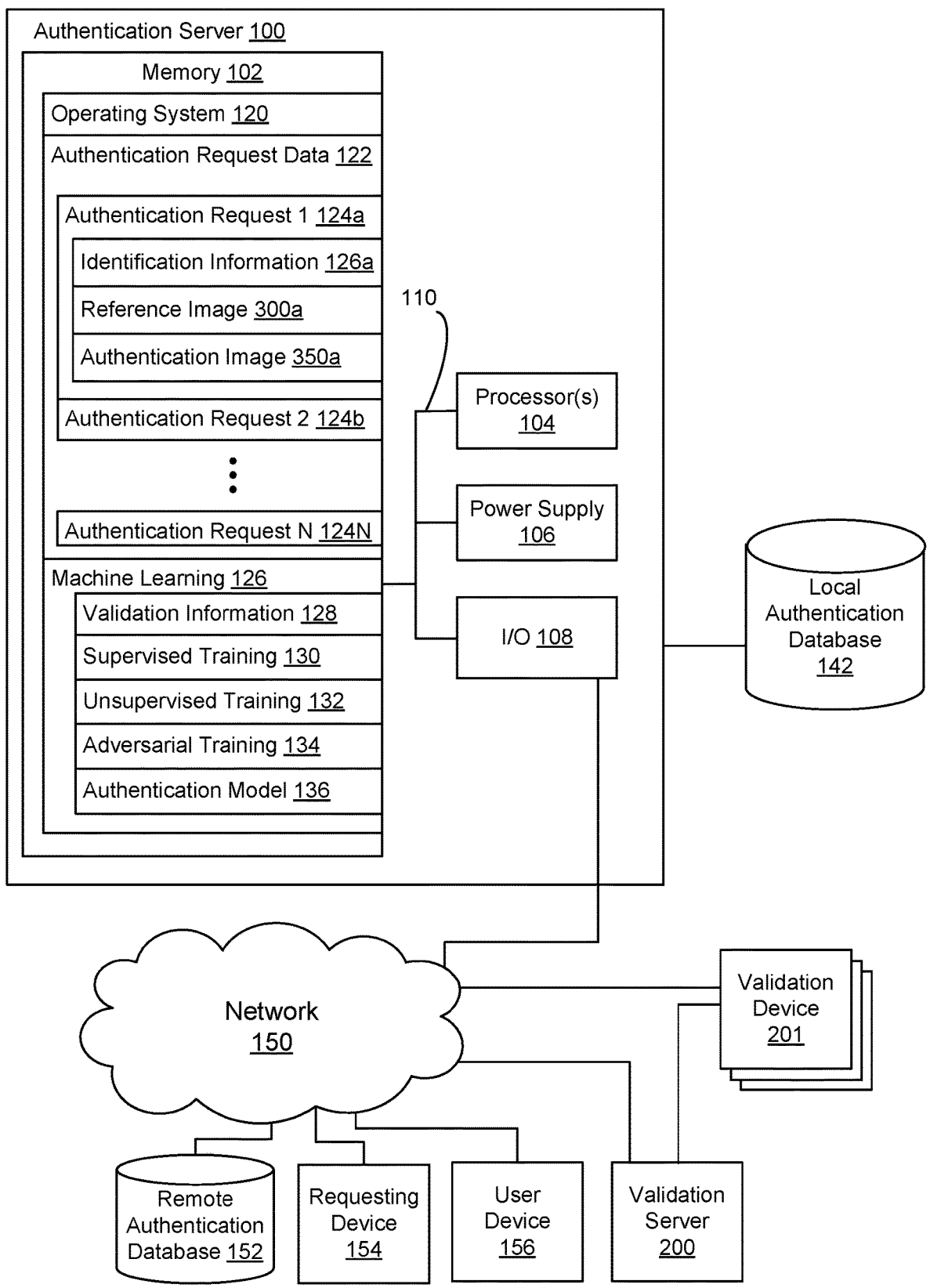
FIG. 1 is a system diagram of an authentication system and its context, in accordance with some embodiments.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, some processes, components, and materials have not been described in exhaustive detail so as not to unnecessarily obscure pertinent aspects of the embodiments described herein.

The systems and methods described herein pertain to machine learning algorithms for determining validity of one or more images that correspond to an authentication request. These systems and methods improve on prior techniques for determining image validity of images from an authorization request. In some embodiments, an authentication request is received from a requesting device (e.g., in connection with a payment or other secure transaction). In some embodiments, the authentication request includes an image of an identification document, such as a passport (e.g., that is associated with a user for whom a secure transaction is being performed). In some embodiments, the authentication request includes an image of the user (e.g., a recent "selfie" image). In response to the authentication request, an authentication system determines validity of the image of the identification document and/or compares the image of the user with the image of the identification document to determine whether matching criteria are met. Information about previously analyzed authentication requests is used by the authentication system to generate a model that is used to evaluate incoming authentication requests. In some embodiments, the model is generated via supervised machine learning (e.g., the model is generated and/or refined using validation faults labeled by a human reviewer). In some embodiments, the model is generated via unsupervised machine learning (e.g., the model is generated based on an unlabeled set of data). The model is used to determine whether criteria are met for transmitting an image from an authentication request to a validation system.

In some embodiments, the authentication systems described herein decrease the time required for human review of identification documents (e.g., by using a model generated by a machine learning system to analyze an image and provide information to human reviewers about information generated by the analysis) and/or reduce the extent of human review used for authenticating identification documents (e.g., by using the model to determine whether to bypass human review). Using machine learning as described herein to reduce the extent of human review and/or to reduce the time required for human review improves the authentication device by making the processing of authentication requests faster and more efficient, with less required human interaction, which in turn reduces the processing and power used by an authentication server and/or a validation device.

Additionally, there is a need to analyze identification documents to determine whether the identification documents are authentic, while maintaining compliance of the data set with applicable security standards. For example, the security of authentication data is maintained in compliance with the payment card industry data security standard (PCI DSS). Whereas existing machine learning systems may rely on labels assigned to a public set of data, PCI DSS compliance requires limited access to data sets. However, the usability of a model generated by a machine learning system improves as the size of the available data set increases. Various embodiments described herein advantageously perform machine learning using data generated by a limited set of human validation reviewers. Using a model generated by a machine learning system to perform image analysis reduces the amount of time required for human review of authorization requests, which increases the rate of authorization request processing while maintaining security of processed data.

FIG. 1 is a system diagram of an authentication server 100 (also referred to herein as a "machine learning system"), in accordance with some embodiments. The authentication server 100 typically includes a memory 102, one or more processor(s) 104, a power supply 106, an input/output (I/O) subsystem 108, and a communication bus 110 for interconnecting these components.

The processor(s) 104 execute modules, programs, and/or instructions stored in the memory 102 and thereby perform processing operations.

In some embodiments, the memory 102 stores one or more programs (e.g., sets of instructions) and/or data structures, collectively referred to as "modules" herein. In some embodiments, the memory 102, or the non-transitory computer readable storage medium of the memory 102 stores the following programs, modules, and data structures, or a subset or superset thereof:

- an operating system 120;
- an authentication request data module 122, which stores information for a plurality of authentication requests 124 (e.g., a first authentication request 124a, a second authentication request 124b . . . Nth authentication request 124N), each of which includes information such as identification information 126 (e.g., unique identification, user name, user password, user residential information, user phone number, user date of birth, and/or user e-mail), a reference image 300a, and/or an authentication image 350a; and
- a machine learning module 126 that uses supervised training module 130, unsupervised training module 132, and/or adversarial training module 134 to generate authentication model 136 (e.g., by analyzing validation information 128 corresponding to multiple authentication requests 124).

The above identified modules (e.g., data structures and/or programs including sets of instructions) need not be implemented as separate software programs, procedures, or modules, and thus various subsets of these modules may be combined or otherwise re-arranged in various embodiments. In some embodiments, the memory 102 stores a subset of the modules identified above. In some embodiments, a remote authentication database 152 and/or a local authentication database 142 store a portion or all of one or more modules identified above (such as authentication request data 122, validation information 128, and/or authentication model 136). Furthermore, the memory 102 may store additional modules not described above. In some embodiments, the modules stored in the memory 102, or a non-transitory computer readable storage medium of the memory 102, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 104. In some embodiments, one or more of the modules described with regard to the memory 102 is implemented in the memory 202 of a validation device 201 (FIG. 2) and executed by the processor(s) 204 of the validation device 201. In some embodiments, one or more of the modules described with regard to the memory 102 is implemented in the memory 1202 of a user device 156 and executed by the processor(s) 1204 of the user device 156. For example, machine learning module 126 is distributed across authentication server 100, validation device(s) 201, validation server 200, and/or user device 156

In some embodiments, for each received authentication request 124, machine learning module 126 stores data for training authentication model, such as:

- Channel via which the authentication request 124 was received (e.g., mobile, web, and/or application programming interface (API))
- internet protocol (IP) address from which the authentication request 124 was received
- camera information (e.g., camera model, device of which the camera is a component, and/or orientation of camera relative to device);
- transaction origination location (e.g., country, state, province, and/or city);
- type of identification document captured in reference image 300 (e.g., passport, driver license, and/or corporate identification badge);
- identification document origination location (e.g., country, state, province, and/or city); and/or
- validation information 128 (e.g., including a verification outcome such as verified, fraud detected, and/or rejected, and also including, in some embodiments, reasons information explaining one or more reasons for the verification outcome, such as one or more of the reasons in FIG. 10B).

In some embodiments, generating the authentication model 136 includes generating a regression algorithm for prediction of continuous variables (e.g., perspective transformation of a reference image 300 and/or a more complex transformation describing bending of passport pages).

In some embodiments, the I/O subsystem 108 communicatively couples the computing system 100 to one or more devices, such as a local authentication database 142, a remote authentication database 152, a requesting device 154, a user device 156, validation server 200 (e.g., including one or more server components (e.g., one or more processor(s) and memory) and/or modules described with regard to authentication server 100) and/or validation device(s) 201 via a communications network 150 and/or via a wired and/or wireless connection. In some embodiments, the communications network 150 is the Internet.

The communication bus 110 optionally includes circuitry (sometimes called a chipset) that interconnects and controls communications between system components.

Typically, an authentication system for processing authentication requests includes a server computer system 100 that is communicatively connected to one or more validation devices 201 (e.g., via a network 150 and/or an I/O subsystem 108). In some embodiments, the authentication system receives an authentication request (e.g., from a user device 156 that captures an image of a user or from a requesting device 154 that receives an image from user device 156). For example, the authentication request is a request to authenticate the identity of a user 124 (e.g., a user that is a party to a transaction or a user that is requesting access to a system or physical location). Requesting device 154 is, for example, a device of a merchant, bank, transaction processor, computing system or platform, physical access system, or another user.

Figure 3A:
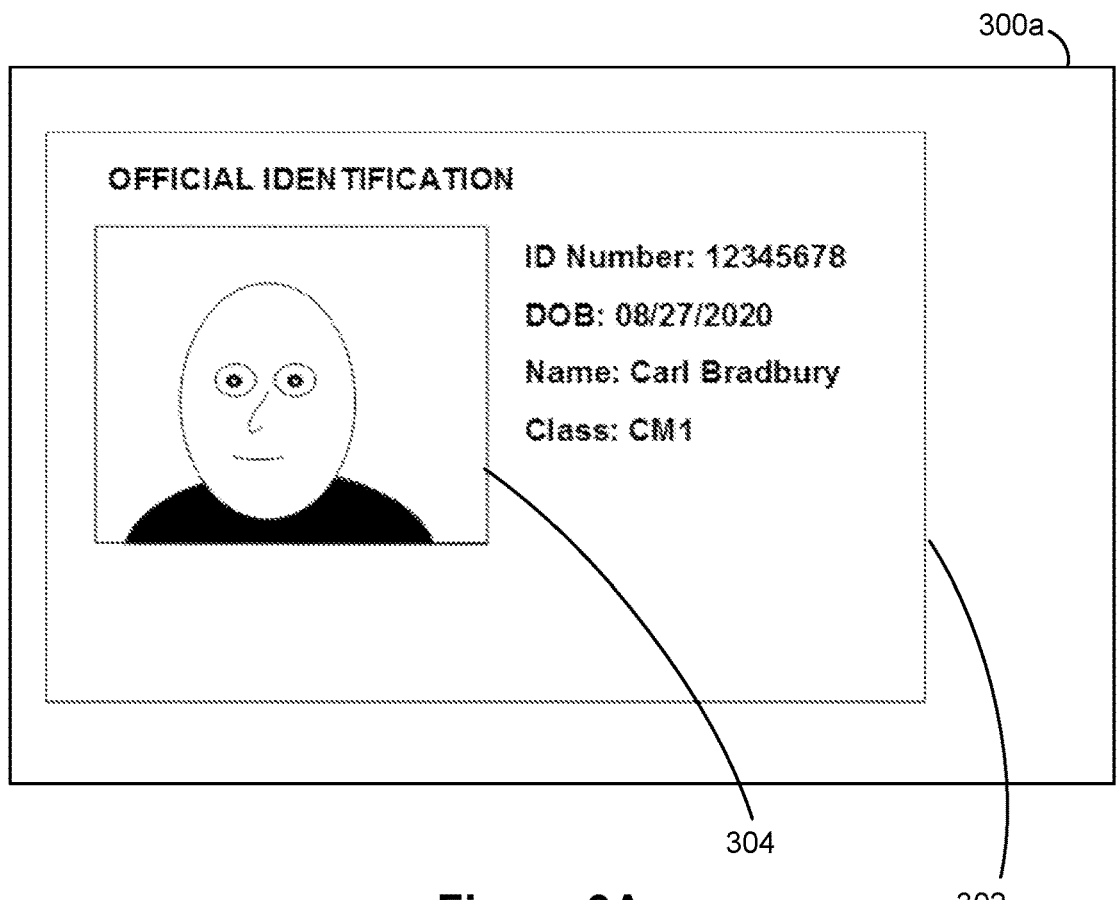
FIG. 3A illustrates a reference image, in accordance with some embodiments.
Figure 3B:
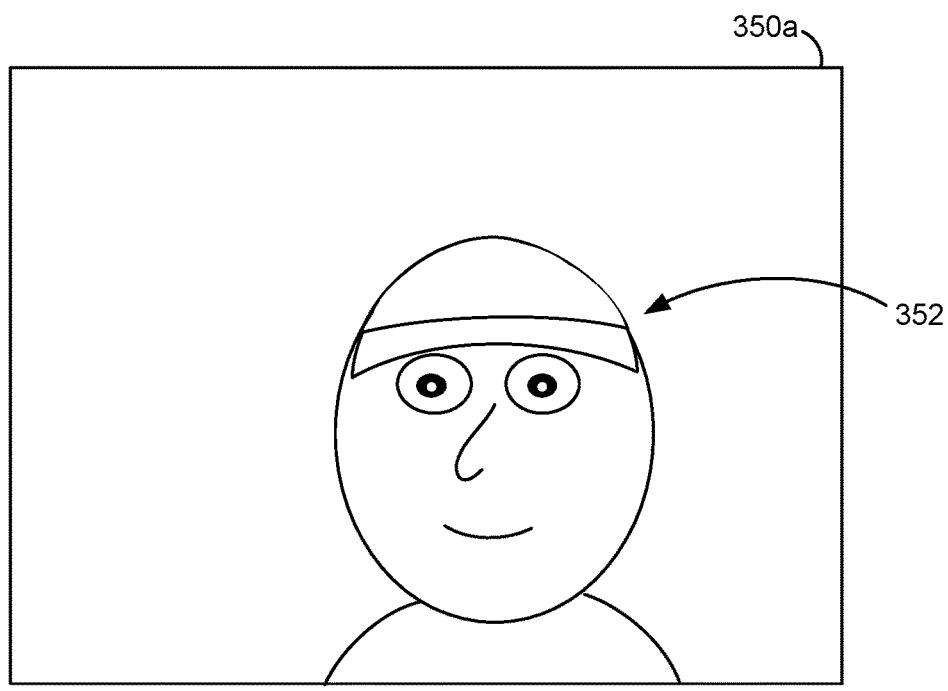
FIG. 3B illustrates an authentication image, in accordance with some embodiments.
Figure 4:
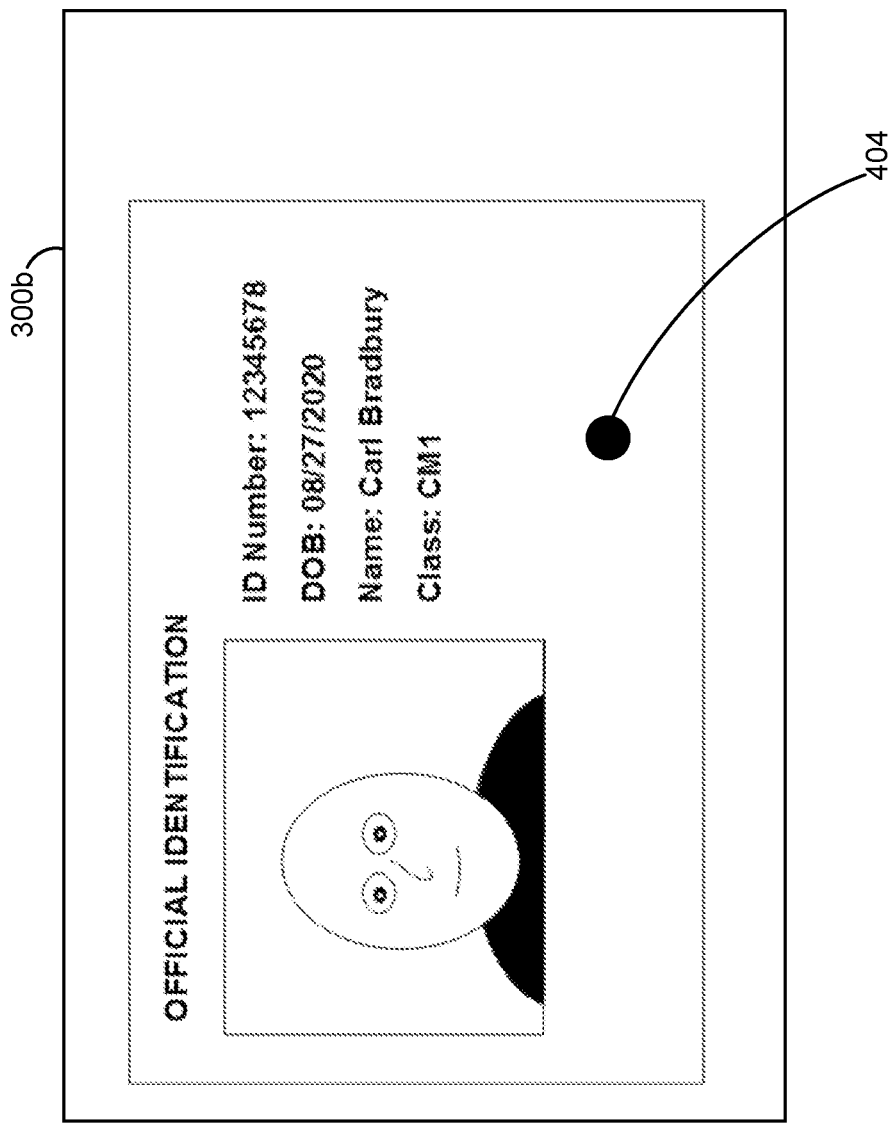
FIG. 4 illustrates an example of a reference image that includes a fault, in accordance with some embodiments.
Figure 5:
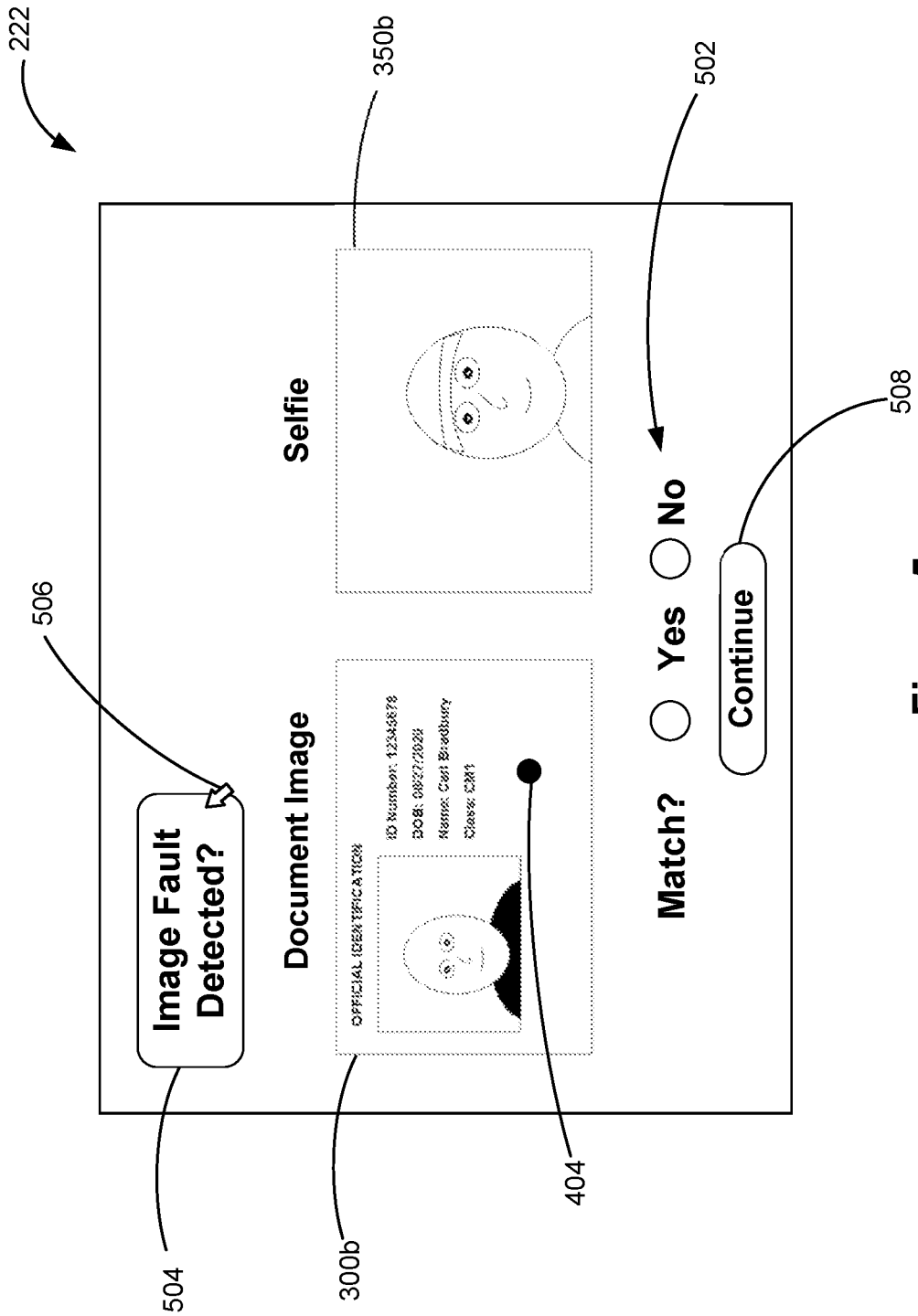
FIGS. 5-9 illustrate a validation user interface that receives fault tagging input, in accordance with some embodiments.

In some embodiments, an authentication request includes a reference image 300 (e.g., 300a as illustrated in FIG. 3A, or 300b, as illustrated in FIG. 4). For example, reference image 300 is an image of an identification document for a user 124). In some embodiments, an authentication request includes an authentication image 350 (e.g., 350a, as illustrated in FIG. 3B). For example, authentication image 350 is an image, series of images, and/or video of the user 124 captured by a user device 156, such as a recent "selfie" of the user 124. In some embodiments, an authentication request includes an authentication image 350 and the authentication system locates a reference image 300 that corresponds to the user 124 that provided the authentication image 350.

In some embodiments, the authentication server 100 causes a validation device 201 to display all or a part of a reference image 300 and/or all or a part of an authentication image 350 for human review. In some embodiments, the validation device 201 receives input that corresponds to a determination of whether authentication is successful (e.g., based on whether reference image 300 is sufficiently similar to the authentication image 350). In some embodiments, validation device 201 transmits validation information 128 that corresponds to a determination of whether authentication is successful (e.g., indicating that a reference image 300 is a match for authentication image 350, indicating that reference image 300 is not a match for authentication image 350, and/or indicating that a fault was detected in reference image 300 and/or authentication image 350).

Figure 2:
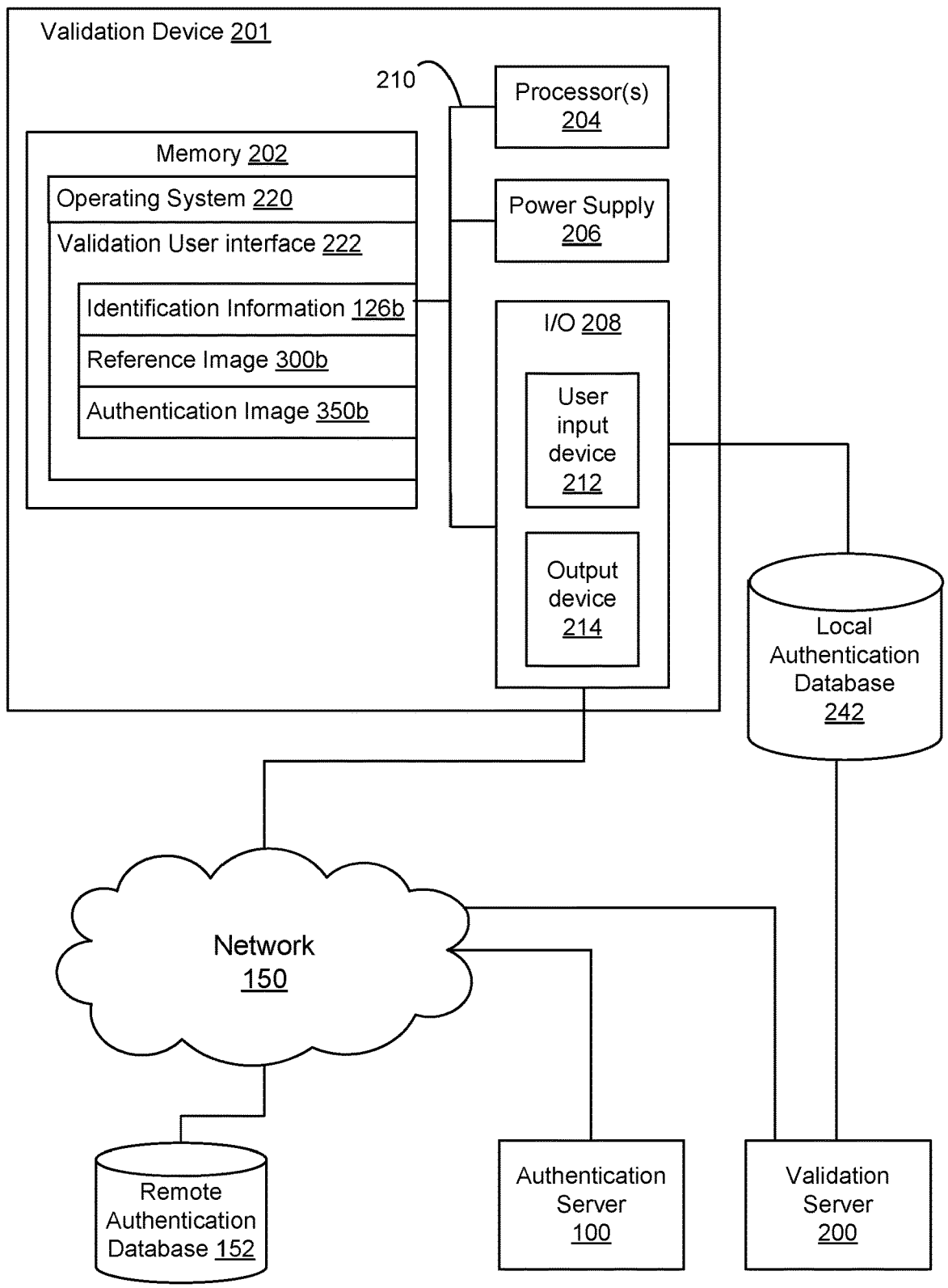
FIG. 2 is a system diagram of a verification device, in accordance with some embodiments.

FIG. 2 is a system diagram of a validation device 201 that displays validation information and/or receives validation input, in accordance with some embodiments. The validation device 201 typically includes a memory 202, one or more processor(s) 204, a power supply 206, an input/output (I/O) subsystem 208, and a communication bus 210 for interconnecting these components. In some embodiments, validation device 201 is coupled to a validation server 200 (e.g., that receives data from authentication server 100, transmits data to authentication server 100, and/or manages validation device(s) 201 (e.g., by transmitting data to validation device(s) 201 and/or receiving data from validation device(s) 201)). In some embodiments, validation device(s) 201 are managed by authentication server 100 (e.g., including transmitting data to authentication server 100 and/or receiving data from authentication server 100).

The processor(s) 204 execute modules, programs, and/or instructions stored in the memory 102 and thereby perform processing operations.

In some embodiments, the memory 202 stores one or more programs (e.g., sets of instructions) and/or data structures, collectively referred to as "modules" herein. In some embodiments, the memory 202, or the non-transitory computer readable storage medium of the memory 202 stores the following programs, modules, and data structures, or a subset or superset thereof:

an operating system 220; and
a validation user interface 222, which displays information (e.g., identification information 126b, a reference image 300b and/or an authentication image 350b) and/or includes one or more input controls for receiving validation input.

The above identified modules (e.g., data structures, and/or programs including sets of instructions) need not be implemented as separate software programs, procedures, or modules, and thus various subsets of these modules may be combined or otherwise re-arranged in various embodiments. Furthermore, the memory 202 may store additional modules not described above. In some embodiments, the modules stored in the memory 202, or a non-transitory computer readable storage medium of the memory 202, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 204. In some embodiments, one or more of the modules described with regard to the memory 202 is implemented in the memory 102 of a server computing system 100 (FIG. 1) and executed by the processor(s) 104 of the server computing system 100.

In some embodiments, the I/O subsystem 208 communicatively couples the validation device 201 to one or more devices (e.g., user input device 212, output device 214, and/or server computer system 100) via a communications network 150 and/or via a wired and/or wireless connection. In some embodiments, a user input device 212 and/or an output device 214 are integrated with validation device 201 (e.g., as a touchscreen display). In some embodiments, user input device 212 and/or output device 214 are peripheral devices communicatively connected to validation device 201. In some embodiments, a user input device 212 includes a keyboard and/or a pointer device such as a mouse, touchpad, and/or stylus. In some embodiments, output device 214 includes, for example, a display and/or a speaker.

In some embodiments, validation user interface 222, user input device 212, and/or output device 214 are incorporated into server computer system 100 (e.g., rather than being implemented in a separate validation device 201).

The communication bus 210 optionally includes circuitry (sometimes called a chipset) that interconnects and controls communications between system components.

In some embodiments, validation device 201 (and/or authentication server 100) displays, by a validation user interface 222 displayed by output device 214, identification information 126, reference image 300, and/or authentication image 350. In some embodiments, a reviewer viewing validation user interface 222 provides input to validation device via user input device 212. The input provided by the reviewer includes, for example, information regarding the validity of reference image 300 (e.g., the results of one or more validity checks for reference image 300), information regarding the validity of authentication image 350 (e.g., the results of one or more validity checks for authentication image 350), and/or information regarding the similarity of reference image 300 and authentication image 350 (e.g., the results of one or more similarity checks for reference image 300 and authentication image 350).

FIG. 3A illustrates a reference image 300a, in accordance with some embodiments. Reference image 300a is, for example, an image of an identification document 302 that includes a facial image 304 of a user. For example, reference image 300a is an image of an identification card, a driver's license, a passport, a financial instrument (e.g., credit card or debit card), or a facility access card.

FIG. 3B illustrates an authentication image 350a that includes a facial image 352 of the user, in accordance with some embodiments. For example, authentication image 350a is a "selfie" captured using user device 156. Authentication image 350a is, e.g., a still image or an image extracted from a video. In some embodiments, the authentication image 350a includes a series of images or a video (e.g., used for determining that the authentication image 350 meets liveness requirements).

FIG. 4 illustrates an example of a reference image 300b that has been captured of the reference document 302 after the reference document 302 has been punched (as indicated by the puncture hole 404 that is visible in reference image 300b).

FIGS. 5-9 illustrate a validation user interface 222 that receives fault tagging input, in accordance with some embodiments. In some embodiments, validation user interface 222 is displayed by output device 214 to a human reviewer (e.g., to facilitate review of authentication information for an authentication request).

In some embodiments, validation user interface 222 includes reference image 300b and/or authentication image 350b (e.g., to allow a reviewer to compare the images and determine whether the images match). For example, in FIG. 5, validation user interface 222 includes reference image 300b, authentication image 350b, and a match control 502 (e.g., receive reviewer input indicating whether or not reference image 300b is a match for authentication image 350b). In some embodiments, validation user interface 222 includes a progression control 508 (e.g., for advancing to a subsequent set of authentication review data, a subsequent interface and/or a subsequent stage of validation user interface 222). For example, in a case where no image fault is present in reference image 300b or authentication image 350b, a human reviewer may use match control 502 to indicate whether or not authentication image 350b is a match for reference image 300b and then use progression control 508 to advance to a subsequent authentication review.

In some embodiments, validation user interface 222 includes one or more controls for indicating that the human reviewer has detected a fault and/or for identifying a fault. For example, in FIG. 5, validation user interface 222 includes an image fault detection control 504 (e.g., a selectable button) that, when activated, causes validation device 201 to store and/or transmit data indicating that a fault has been detected. In some embodiments, activation of fault detection control 504 initiates a fault location indication mode. For example, in FIG. 5, because reference image 300b includes an indication of a puncture hole 404, the human reviewer has provided input using a user input device 212 (e.g., as indicated by pointer 506) at a location that corresponds to image fault detection control 504.

Figure 6:
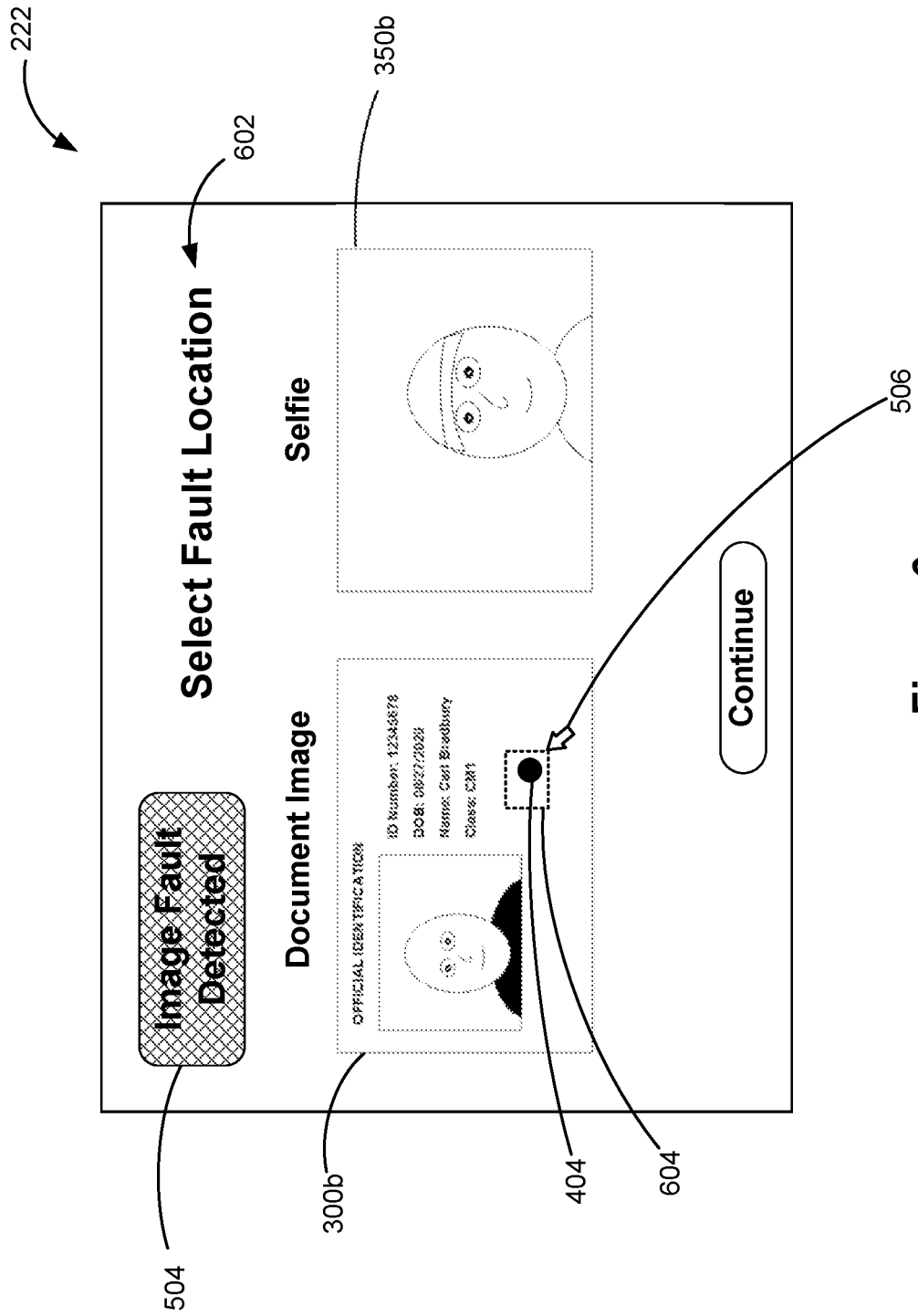

In FIG. 6, in response to detection of the user input at the location that corresponds to image fault detection control 504, a fault location indication stage of validation user interface 222 has been displayed. In some embodiments, validation user interface 222 (e.g., image fault detection control 504) and/or pointer 506 is visually altered to indicate that fault location indication mode is active. In some embodiments, validation user interface 222 displays instructions to select the fault location, as indicated at 602. User input device 212 has been used to select a region that corresponds to punch mark 404, as indicated by the selection box 604. In some embodiments, multiple fault regions may be selected in reference image 300b and/or in authentication image 350b.

Figure 7:
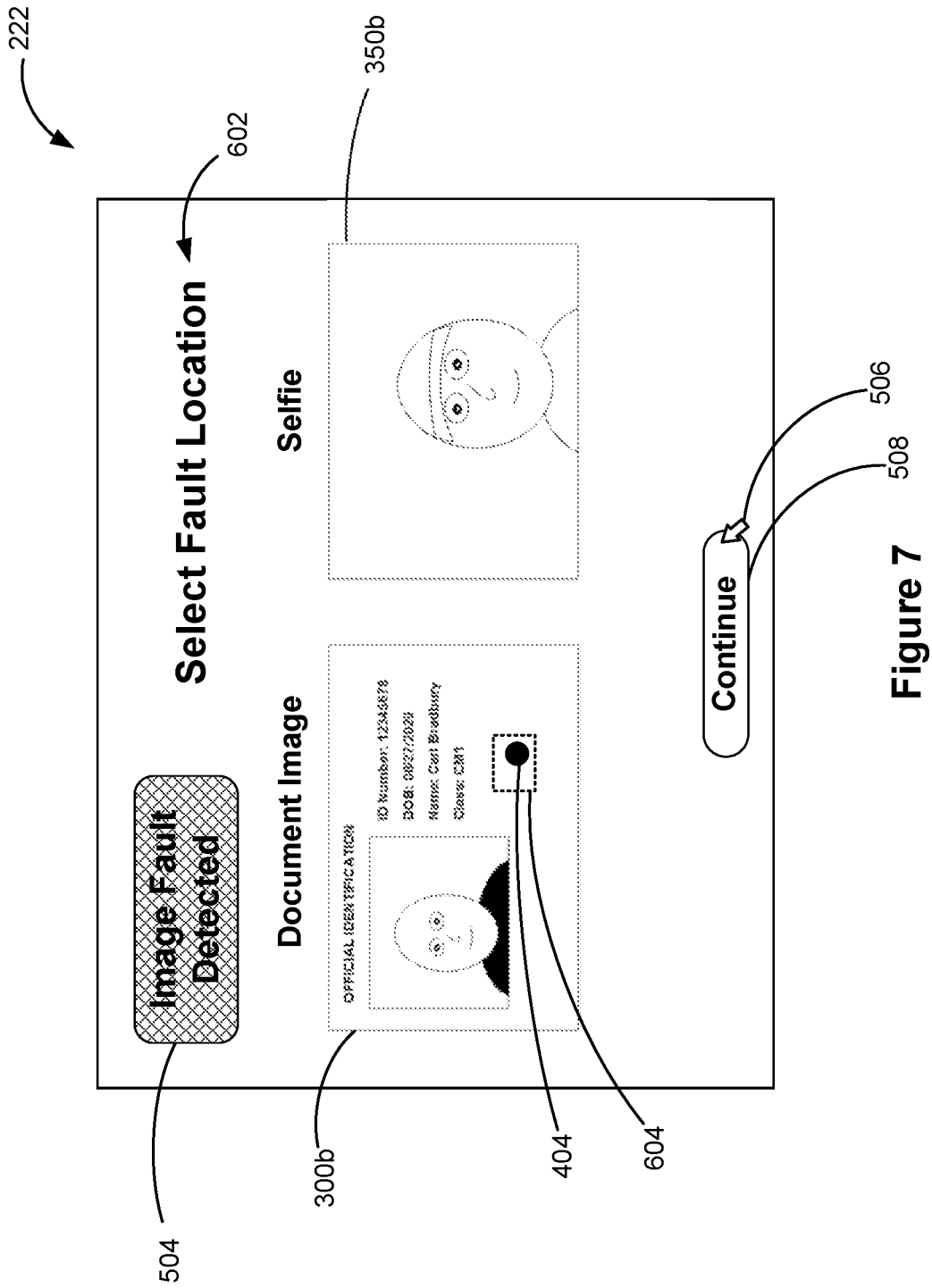

In FIG. 7, while the region that corresponds to the image fault (e.g., punch 404) is selected, input by user input device 212 is detected at a location that corresponds to progression control 508 (e.g., while pointer 506 is at the location that corresponds to progression control 508).

Figure 8:
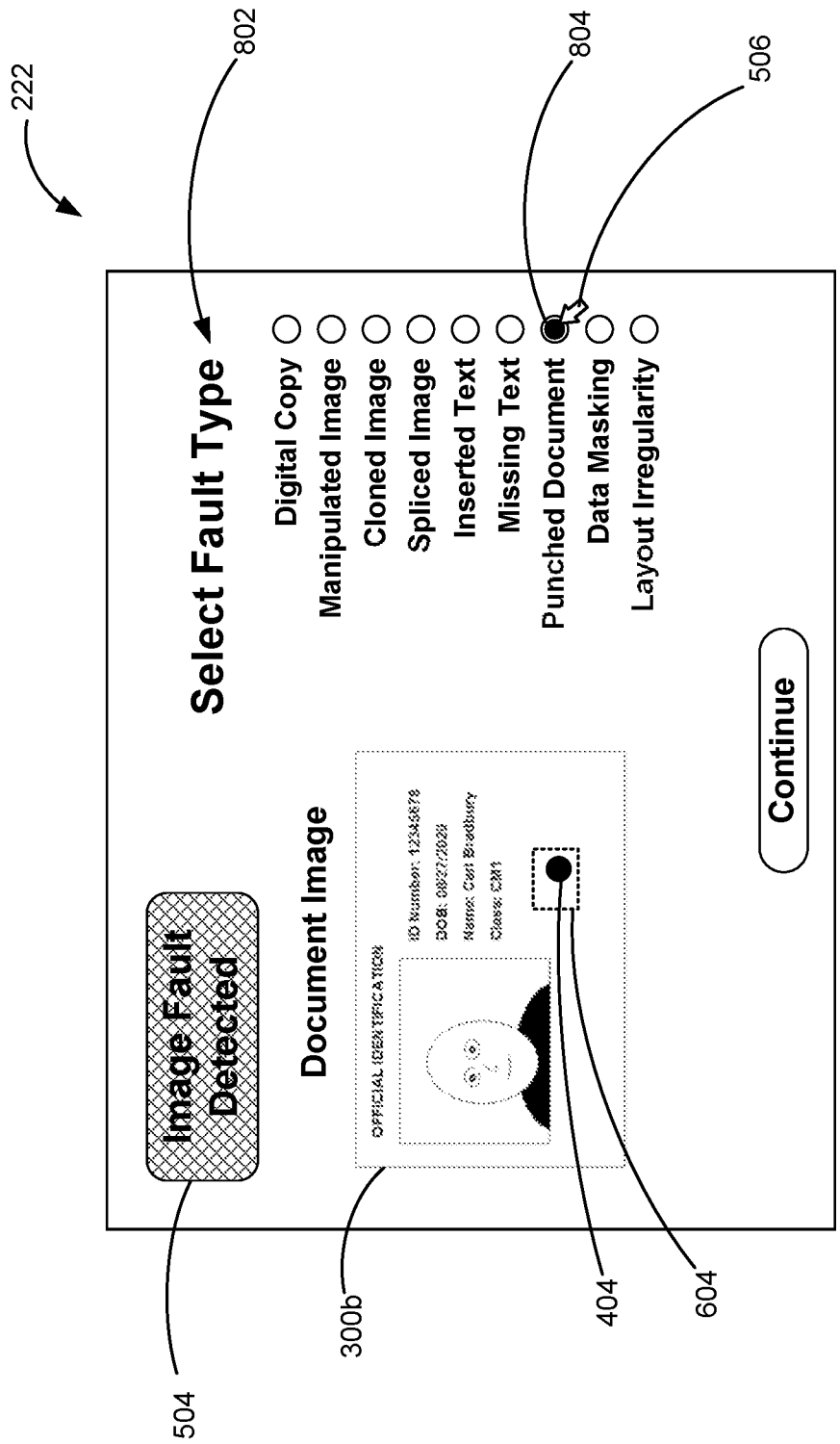

In FIG. 8, in response to detection of the input by user input device 212 at the location that corresponds to progression control 508, a fault type identification stage of validation user interface 222 has been displayed. In some embodiments, in the fault type identification stage of validation user interface 222, a plurality of fault types (e.g., as discussed further below with regard to operation 1206) are displayed as selectable options. In some embodiments, validation user interface 222 displays instructions to select the fault type, as indicated at 802. In FIG. 8, an input by the human reviewer has selected the "punched document" fault type, as indicated by the "selected" state of toggle 804. In some embodiments, multiple fault types may be assigned to a fault identified in a selected fault region (e.g., as indicated by selection box 604).

Figure 9:
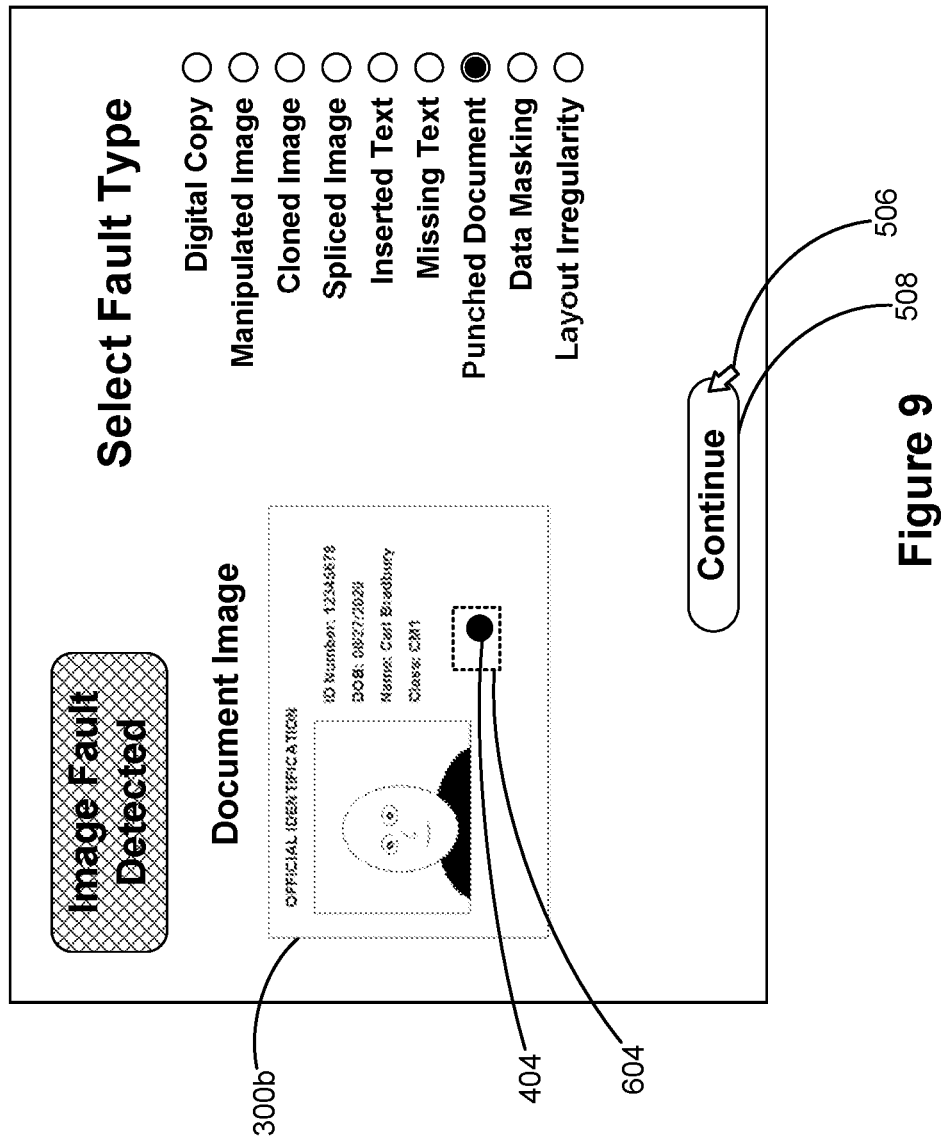

In FIG. 9, while the fault type that corresponds to the image fault is selected, input by user input device 212 is detected at a location that corresponds to progression control 508 (e.g., while pointer 506 is at the location that corresponds to progression control 508). In some embodiments, in response to detection of the input at the location that corresponds to progression control 508, validation information 128 is transmitted from validation device 201 to authentication server 100 (e.g., for use by machine learning module 126). For example, the validation information 128 includes the image 300b, information indicating the fault type identified as described with regard to FIG. 8, and/or information indicating the region selected by selection box 604.

It will be recognized that the description of validation user interface 222 provided with reference to FIGS. 5-9 is one illustrative example of an approach to a user interface for image fault tagging, and that various controls, inputs, and/or sequences of operations are used in accordance with various embodiments for human tagging of image faults. For example, in some embodiments, an indication that an image fault has been detected may be provided by selection of at least a portion of reference image 300b or at least a portion of authentication image 350b (e.g., without display and/or activation of a control 504 for indicating detection of an image fault).

In some embodiments, the machine learning module 126 includes a supervised training module 130 that uses image fault data generated by human reviewers (e.g., as described with regard to FIG. 5-9) to train authentication model 136 to identify image faults. For example, the machine learning module 126 uses the human-tagged image fault data to generate rules of an authentication model 136 for determining the presence and/or the location of faults in images included in an authentication request 124. In some embodiments, the machine learning module 126 applies the generated authentication model 136 to perform image analysis (e.g., using computer vision techniques) for identifying image faults in images (such as a reference image 300 and/or an authentication image 350) of a received authentication request 124.

In some embodiments, in accordance with a determination by machine learning module 126 that a fault is present in an image, the image that includes the fault is displayed to a human reviewer for further review (e.g., with a prompt to identify a location of fault). In some embodiments, in accordance with a determination by machine learning module 126 that no fault is present in an image, the image that includes the fault is displayed to a human reviewer for further review (e.g., with a prompt to identify a location of fault). In some embodiments, in accordance with a determination by machine learning module 126 that no fault is present in an image, the image is displayed to a human reviewer for further review (e.g., with a prompt indicating no fault was detected). In some embodiments, the human input is fed back into the supervised machine learning system.

In some embodiments, the machine learning module 126 analyzes a set of incoming authentication requests 124 (e.g., authentication requests received during a predetermined window of time). In some embodiments, machine learning module 126 includes an unsupervised training module 132 that trains authentication model 136 using the set of incoming authentication requests without using human-tagged validation information (e.g., in addition to or in lieu of a supervised training module 130 that trains authentication model 136 using human-tagged validation information (e.g., as described with regard to FIGS. 5-9)).

In some embodiments, the machine learning module 126 generates multiple authentication models 136. For example, a respective authentication model 136 is customized based on one or more parameters (e.g., as defined for an entity (e.g., bank, merchant, and/or class of users), type of device, type of identification, and/or type of transaction).

In some embodiments, the machine learning module 126 determines a subset of the set of incoming authentication requests 124 that correspond to invalid authentication request activity (e.g., authentication requests that are reported for fraud or that are determined to include a fault). In some embodiments, the unsupervised training module 132 determines that, in the subset of the set of incoming authentication requests 124, a number of invalid authentication requests exceeds a threshold number of invalid submissions and/or a rate of fraudulent activity exceeds a threshold level.

In some embodiments, a validation fault is an invalidity characteristic (e.g., an indication of an internet protocol (IP) address, geographical area, device type (e.g., a model that is no longer available), camera type, document type, transaction type, time at which request is received, and/or verification outcome) of the subset of the set of incoming authentication requests. In some embodiments, weights are applied to the first validation fault, the second validation fault, and/or any additional validation faults. In some embodiments, weights are adjusted over time (e.g., in response to regional activity, transaction types determined to be problematic, etc.).

FIGS. 10A-10C are diagrams of validation information 128 in accordance with some embodiments. In order to comply with privacy regulations that give users the right not to be subject to certain decisions solely based on automated processing without having access to an explanation of the rationale behind the decision, some embodiments of the machine learning module 126 train the authentication model 136 to output not only an authentication decision, but also an explanation corresponding to the decision, so that users may have more efficient access to the rationale behind verification rejections.

FIG. 10A is a detailed diagram of validation information 128 including authorization request data 1002 corresponding to N authorization requests in accordance with some embodiments. For each authentication request 124, authentication request data 1002 is stored as validation information 128 in the machine learning module 126. The authentication request data includes image data 1004, decision data 1006, and reason data 1008. In some embodiments, N is less than 100. In some embodiments, N is between 100 and 1,000,000. In some embodiments, N is greater than 1,000,000. In some embodiments, if validation information 128 includes a large amount of authorization request data 1002, older data 1002 is deleted after a predetermined amount of time after it has been used to train the model 136. In some embodiments, a subset of data 1002 is deleted manually by an operator. In some embodiments, a subset of data 1002 is deleted upon request of the user (as described in more detail below).

In some embodiments, image data 1004 includes a reference image 300, an authorization image 350, or both. Alternatively, image data 1004 includes one or more components of a reference image 300 or an authorization image 350.

In some embodiments, decision data 1006 (also referred to herein as "authentication decision") includes an authentication outcome (e.g., valid, invalid, verified, fraud detected, fraud not detected, rejected, reference and authentication images match, reference and authentication images do not match, a fault was detected in the image, and so forth). The authentication outcome is the result of machine learning module 126 applying authentication model 136 to image data 1004. Alternatively, the authentication outcome is the result of human review, as described above with reference to FIG. 5-9. In some embodiments, machine learning module 126 uses supervised training 130, unsupervised training 132, and/or adversarial training 134 to refine the authentication module 136 using the human reviewer-sourced authentication outcome.

In some embodiments, reason data 1008 (also referred to herein as "explanation information") includes an explanation regarding one or more of the rationales behind the authentication decision 1006 (e.g., information indicating the identified fault type and/or location as described with reference to FIGS. 6-9 above, information indicating a fraud indication, information indicating a readability fault, and so forth). In some embodiments, reason data 1008 includes an explanation regarding one or more of the validation faults, fraud indications, and/or readability faults described with reference to FIGS. 5-9 above.

FIG. 10B is a table of reasons 1008 in accordance with some embodiments. In some embodiments, the authentication model is trained using one or more of these reasons in combination with respective image data 1004 and/or decision data 1006. In some embodiments, each reason is assigned a code, and a reason code table 1008 is stored in the memory 102. The reasons in table 1008 are provided for illustration of the concept of a verification or authentication outcome explanation, and are only examples. Any rationale explaining why a particular identification document passed or failed an authentication process is within the scope of the presently described embodiments. Preferably, the reasons 1008 are easily understood by the user (e.g., "the ID's barcode appears to be fraudulent"), versus vaguely understandable (e.g., "error code 1004").

FIG. 10C illustrates validation information for three example authentication requests. For a first request 1002a, a user transmitted a reference image 300 to the authentication server 100 as part of an authentication request 124a. The reference image 300 is stored as image data 1004a, and either a human reviewer uses one or more of the techniques described above with reference to FIGS. 5-9 to classify the image 300 as fraudulent due to the image appearing to be manipulated, or the machine learning module 126 applies the authentication model 136 to the image 300 and the model outputs a decision that the image 300 is fraudulent due to the image appearing to be manipulated. As such, decision data 1006a stores the authentication result "Invalid" and reason data 1008a stores the reason corresponding to the authentication result "02" or "Manipulated Image."

For two subsequent requests, two more users transmit reference images 300 to the authentication server 100 as part of authentication requests 124b and 124c, respectively. The users' respective images are stored as image data 1004b and 1004c, and the respective decisions 1006b and 1006c and respective reasons 1008b and 1008c are stored in memory 102 as validation information 128.

In some embodiments, if a decision 1006 and/or a reason 1008 corresponding to any of the authorization request data 1002 is determined by human review, the image 1004 corresponding to the decision 1006 and/or the reason 1008 is used as machine learning input during subsequent training (refining) of the authentication model 136, and each image 1004 is labeled with corresponding decision data 1006 and reason data 1008. Specifically, the model 136 is trained using an array of tuples, for example, designated by $(x, y_1, y_2)$, wherein x=an input image, $y_1$=an authentication decision corresponding to the input image, and $y_2$=an explanation of the rationale behind the authentication decision of the input image. Stated another way, machine learning module 126 trains the authentication model 136 using labeled input data, wherein the input data is the image data x, and the two labels are the authentication decision $y_1$ and the explanation information $y_2$. As a result of the training, the authentication model 136 includes a plurality of weights representing rules for determining decisions 1006 and reasons 1008 corresponding to input image data 1004.

In some embodiments, one input image x is associated with R reasons 1008, wherein R is an integer greater than or equal to two. For example, an input image 300 may be determined to be invalid due to having both a punched hole as well as missing text (R=2). In some embodiments, the machine learning module 126 trains the model 136 using a single tuple (x, $y_1$, $y_2$), wherein $y_2$ includes the R reasons. Alternatively, the machine learning module 126 trains the model 136 using R tuples, wherein $y_2$ for each of the R tuples includes only one of the R reasons 1008.

In some embodiments, when the decision data 1006 includes a positive authentication decision (e.g., valid, verified, no fraud or faults detected, images match, and so forth) for a particular image 1004, machine learning module 126 does not store reason data 1008 with the particular image 1004 and decision 1006, and therefore does not use a reason when training the model using the particular image 1004. For example, the machine learning module 126 trains the model 136 using a tuple (x, $y_1$, $y_2$) wherein $y_2$ includes no data, or a placeholder variable indicating no reason. Alternatively, the machine learning module 126 trains the model 136 using a pair (x, y) wherein x is the image data 1004 and y is the decision data 1006.

Figure 11:
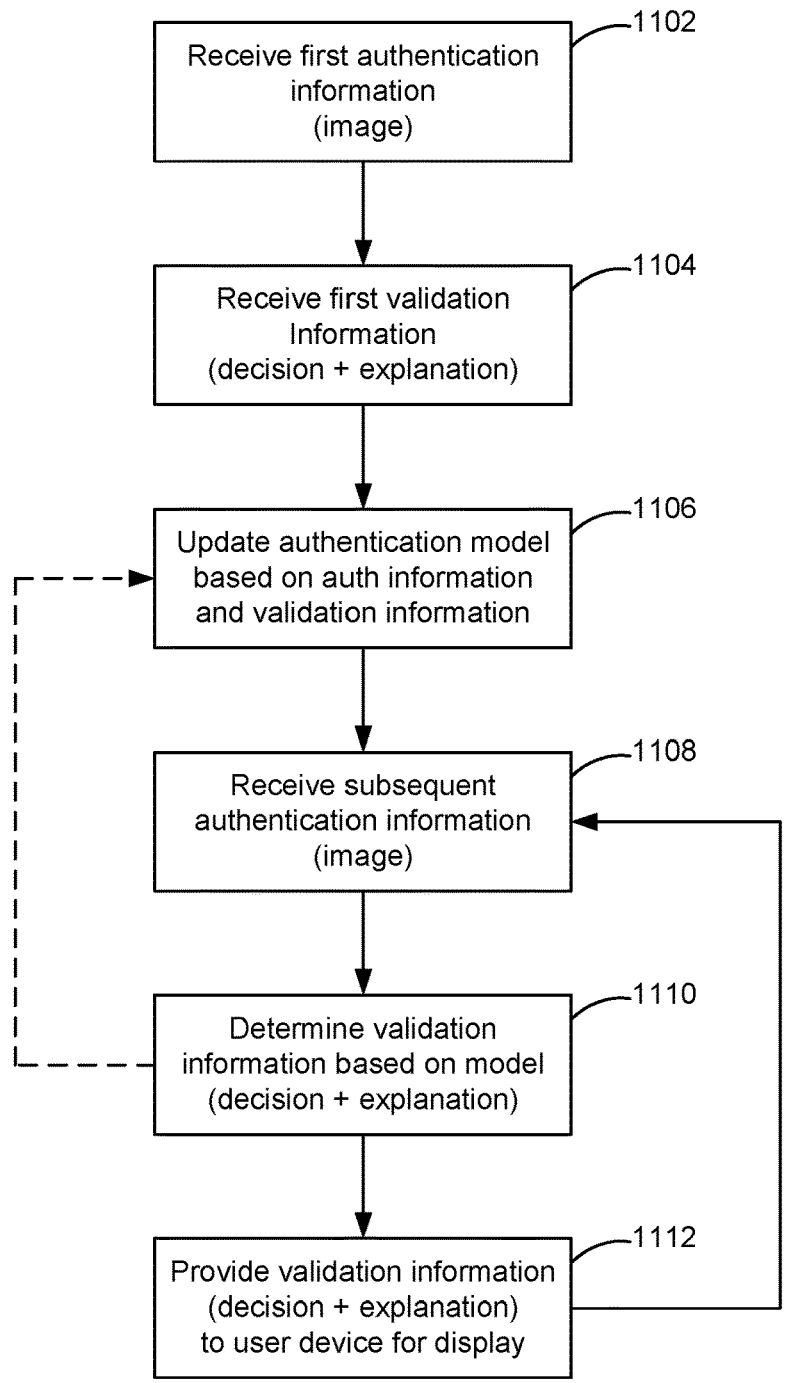
FIG. 11 is a flow diagram illustrating a method for training an authentication model, in accordance with some embodiments.

FIG. 11 is a flow diagram illustrating a method 1100 for training an authentication model 136, in accordance with some embodiments. The method is performed at an authentication server 100, a validation server 200, user device 156, and/or a validation device 201. For example, instructions for performing the method are stored in the memory 102 and executed by the processor(s) 104 of the authentication server computer system 100. In some embodiments, part or all of the instructions for performing the method are stored in the memory 202 and executed by the processor(s) 204 of the validation device(s) 201. In FIG. 11, dotted lines are used to indicate optional operations.

The server receives (1102) first authentication information (e.g., authentication request 124a) for a first transaction. The first authentication information includes at least a first image (e.g., a still image, a video, and/or multiple frames from a video) that corresponds to a first identification document 302. For example, the first image is a reference image 300, such as reference image 300b described with reference to FIG. 4 above. In some embodiments, the authentication request 124 is received from a requesting device 154 or a user device 156.

The server receives (1104) first validation information (e.g., authentication decision 1006a and explanation information 1008a) for the first transaction. In some embodiments, the first validation information is received from a human review process described above with reference to FIGS. 5-9. In some embodiments, the authentication decision 1006a is first determined using the authentication model 136, and the corresponding explanation information 1008a is received from a human review process described above with reference to FIGS. 5-9, in accordance with the determined authentication decision 1006a. In some embodiments, the first validation information includes a decision but no explanation (e.g., when the decision is positive as described above).

The server (e.g., machine learning model 126) updates (1106) authentication model 136 based on the first authentication information 1004a, the first authentication decision 1006a, and the first explanation information 1008a as described with reference to FIGS. 10A-10C above. For example, training module(s) 130, 132, and/or 134 use image fault data generated by human reviewers (e.g., as described with regard to FIG. 5-9) to train the authentication model 136 to identify image faults. For example, the machine learning module 126 uses the human-tagged image fault data to generate and/or update rules for the authentication model 136 (also referred to as "refining the model") for determining the presence of faults in the image(s) included in the authentication request 124.

The server receives (1108) subsequent authentication information (e.g., authentication request 124b) for a subsequent transaction. For example, the subsequent authentication information is for a subsequent transaction by a user that is different from the user that submitted the first authentication information for the first transaction. The subsequent authentication information includes at least a second image (e.g., a still image, a video, and/or multiple frames from a video) that corresponds to a second identification document 302. For example, the second image is a reference image 300, such as reference image 300b described with reference to FIG. 4 above. In some embodiments, the subsequent authentication request 124 is received from a requesting device 154 or a user device 156.

The server (e.g., machine learning module 126) determines (1110) validation information corresponding to the subsequent authentication information, including at least a second authentication decision 1006b and second explanation information 1008b, using the authentication model 136 as described with reference to FIGS. 10A-10C above. For example, the machine learning module 126 applies the refined authentication model 136 to perform image analysis (e.g., using computer vision techniques) for: (i) identifying one or more image faults in the image of the subsequent authentication request 124, wherein the one or more image faults are used as a basis for determining the subsequent authentication decision 1006b; and (ii) identifying the subsequent explanation information 1008b corresponding to the one or more image faults used as the basis for determining the subsequent authentication decision 1006b.

Optionally, upon determination of the subsequent validation information, the server updates (1106) the authentication model 136 upon human review and approval of the determined validation information.

Upon determination of the subsequent validation information, the server provides (1112) the validation information (the authentication decision 1006 and the explanation information 1008) to requesting device 154 and/or user device 156 for display, thereby efficiently providing the user with an explanation regarding the result of the automated authentication process (e.g., one or more reasons the user's identification document was determined, by the machine learning module 126, to be invalid). In some embodiments, step 1112 corresponds with, or is otherwise an extension of, step 1411 (FIG. 14B) and/or step 1432 (FIG. 14C) in U.S. patent application Ser. No. 15/993,366.

In some embodiments, each time the server receives additional authentication requests (e.g., 124c through 124N), the method 1100 continues by implementing steps 1108 through 1112 for each request as described above.

The embodiments described with reference to FIGS. 10A-10C and 11 above provide for the efficient disclosure of explanation information to a data subject (user) when a data processor uses the data subject's personal data to make certain decisions having legal or otherwise significant effects, for situations in which the decision is based on automated processing (such as machine learning). The explanation information is provided as feedback to the user in a manner that is quicker (e.g., at substantially the same time the user receives the decision itself) and more efficient (in that human intervention is not required to determine the explanation) due to the improved machine learning training embodiments described herein.

FIGS. 12A-12B are diagrams of validation information 128 in accordance with some embodiments. In order to comply with privacy regulations that give users the right to have their personal data erased from data sets upon request, some embodiments of the machine learning module 126 include capabilities for not only removing the requested data (e.g., the image 300 or 350), but also removing the impression made by the user's data on the authentication model 136. Updating a data set by removing the user's image and retraining the model based on the updated data set may be very inefficient due to the processing resources involved in retraining a model, especially when the data set is large. For instance, to remove one image from a data set of 2,000,000 images, it is desirable to have an alternative to retraining the model from scratch using 1,999,999 images. Various embodiments described herein provide for the removal of requested images from a data set, and the purging of the data set, by retraining the model based on the inverse of the image data marked for deletion. As such, prior to deleting the requested images, any impression those images made on the model are canceled out, and the model is effectively purged of any knowledge gained by use of the user's images.

FIG. 12A is a detailed diagram of validation information 128 including authorization request data 1202 corresponding to N authorization requests in accordance with some embodiments. For each authentication request 124, authentication request data 1202 is stored as validation information 128 in the machine learning module 126. The authentication request data includes image data 1204 and decision data 1206. In some embodiments, N is less than 100. In some embodiments, N is between 100 and 1,000,000. In some embodiments, N is greater than 1,000,000. In some embodiments, if validation information 128 includes a large amount of authorization request data 1202, older data 1202 is deleted after a predetermined amount of time after it has been used to train the model 136. In some embodiments, a subset of data 1202 is deleted manually by an operator. In some embodiments, a subset of data 1202 is deleted upon request of the user.

In some embodiments, image data 1204 includes a reference image 300, an authorization image 350, or both. Alternatively, image data 1204 includes one or more components of a reference image 300 or an authorization image 350.

In some embodiments, decision data 1206 (also referred to herein as "authentication decision") includes an authentication outcome (e.g., valid, invalid, verified, fraud detected, fraud not detected, rejected, reference and authentication images match, reference and authentication images do not match, a fault was detected in the image, and so forth). The authentication outcome is the result of machine learning module 126 applying authentication model 136 to image data 1204. Alternatively, the authentication outcome is the result of human review, as described above with reference to FIG. 5-9. In some embodiments, machine learning module 126 uses supervised training 130, unsupervised training 132, and/or adversarial training 134 to refine the authentication module 136 using the human reviewer-sourced authentication outcome.

In some embodiments, the validation information 128 further includes reason data (not shown), described with reference to FIGS. 10A-10C above.

FIG. 12B illustrates validation information for an example authentication request 1202a. For a first request 1202a, a user transmitted a reference image 300 to the authentication server 100 as part of an authentication request 124a. The reference image 300 is stored as image data 1204a, and either a human reviewer uses one or more of the techniques described above with reference to FIGS. 5-9 to classify the image 300 as fraudulent, or the machine learning module 126 applies the authentication model 136 to the image 300 and the model outputs a decision that the image 300 is fraudulent. As such, decision data 1206a stores the authentication result "Invalid."

In some embodiments, if a decision 1206 corresponding to any of the authorization request data 1202 is determined by human review, the image 1204 corresponding to the decision 1206 is used as machine learning input during subsequent training (refining) of the authentication model 136, and each image 1204 is labeled with corresponding decision data 1206. Specifically, the model 136 is trained using an array of pairs, for example, designated by (x, y), wherein x=an input image, and y=an authentication decision corresponding to the input image. Stated another way, machine learning module 126 trains the authentication model 136 using labeled input data, wherein the input data is the image data x, and the label is the authentication decision y. As a result of the training, the authentication model 136 includes a plurality of weights representing rules for determining decisions 1206 corresponding to input image data 1204.

When machine learning module 126 receives a user request to delete image data 1204a (specifically, image 1210), machine learning module 126 treats the request as a new authorization request M, storing the image data that is the basis of the request (image 1210) as image data 1204M (or, alternatively, redesignating image data 1204a as image data 1204M), and associating the image data 1204M with a decision 1206M that is the inverse of decision 1206a. For example, if the user's initial authorization request resulted in an "Invalid" decision 1206a, the user's image 1210 is subsequently associated with an inverse "Valid" decision 1206M. It is important to note that "Invalid" and "Valid" are used merely for purposes of illustration, and are not meant to limit the scope of any of the presently described embodiments. For instance, the initial decision may have been "Valid," and the inverse decision would be "Invalid." Further, the initial decision may have anything to do with a classification or category of the input data (here, the image data, but alternatively, any input data that can be fed into a machine learning process), as long as the classification or category has an inverse classification or category that contradicts the initial classification or category (e.g., car/not a car; animal/not an animal; meets a threshold/does not meet a threshold; and so forth).

Upon assigning the inverse decision 1206M to the image 1210, machine learning module 126 performs a subsequent update (refining) procedure on the model 136 using the subsequent request data 1202M. As a result, any impression that image 1210 may have made on the model 136 during the initial update (refining) procedure is canceled out when the model is subsequently updated (refined) based on the association of image 1210 with its inverse attribute, label, and/or decision data 1206M. More specifically, in some embodiments, if an initial model update using request data 1202a resulted in a weight W being added to the model 136, the subsequent model update using request data 1202M (with the inverse label) results in a weight −W being added to the model 136, with the two weights canceling out (W+−W=0). Since the weights cancel out, the model 136 is left with no impression of the image 1210; in other words, subsequent image classification using the model 136 will not be influenced by any weights that were added as a result of having used the image 1210 as a training input to the model 136 in the past. As such, once the model 136 loses its impression of the image 1210, machine learning module 126 may safely delete image 1210 from the data storage of the machine learning module (e.g., memory 102).

Figure 13:
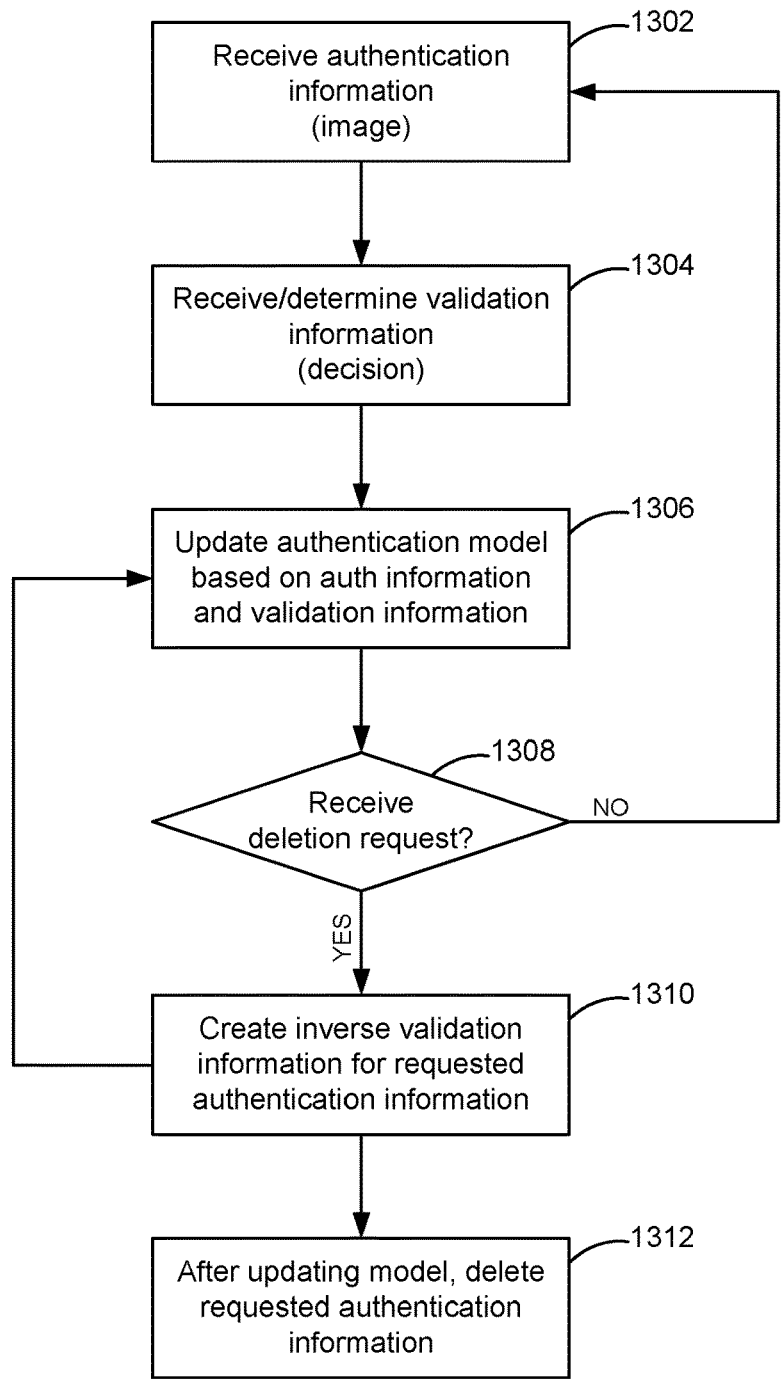
FIG. 13 is a flow diagram illustrating a method for deleting weights from an authentication model, in accordance with some embodiments.

FIG. 13 is a flow diagram illustrating a method 1300 for purging an authentication model 136, in accordance with some embodiments. The method is performed at an authentication server 100, a validation server 200, user device 156, and/or a validation device 201. For example, instructions for performing the method are stored in the memory 102 and executed by the processor(s) 104 of the authentication server computer system 100. In some embodiments, part or all of the instructions for performing the method are stored in the memory 202 and executed by the processor(s) 204 of the validation device(s) 201.

The server receives (1302) first authentication information (e.g., authentication request 124*a*) for a first transaction. The first authentication information includes at least a first image (e.g., a still image, a video, and/or multiple frames from a video) that corresponds to a first identification document 302. For example, the first image is a reference image 300, such as reference image 300*b* described with reference to FIG. 4, or image 1210 described with reference to FIG. 12B. In some embodiments, the authentication request 124 is received from a requesting device 154 or a user device 156.

The server receives (1304) first validation information (e.g., authentication decision 1206*a*) for the first transaction. In some embodiments, the first validation information is received from a human review process described above with reference to FIGS. 5-9. In some embodiments, the authentication decision 1206*a* is determined based on the authentication model 136 (e.g., using an automated processes such as those described above with reference to machine learning module 126).

The server (e.g., machine learning model 126) updates (1306) authentication model 136 based on the first authentication information 1204*a* and the first authentication decision 1206*a* as described with reference to FIGS. 12A-12B above. For example, training module(s) 130, 132, and/or 134 use image fault data generated by human reviewers (e.g., as described with regard to FIG. 5-9) to train the authentication model 136 to identify image faults. For example, the machine learning module 126 uses the human-tagged image fault data to generate and/or update rules for the authentication model 136 (also referred to as "refining the model") for determining the presence of faults in the image(s) included in the authentication request 124.

If a deletion request is received (1308: YES), the method 1300 proceeds with step 1310. Otherwise (1308: NO), the method 1300 proceeds when another authentication request is received (1302). In some embodiments, an alternative version of method 1300 begins at step 1308 when a deletion request is received.

Upon receiving (1308) a deletion request (e.g., from requesting device 154 or user device 156) pertaining to the user's personal data (e.g., designating for deletion an image 1210 that the user had previously submitted to the server as part of a prior authentication request 1202*a*), the server creates (1310) creates inverse validation information for the first image as described with reference to FIG. 12B. In some embodiments, the inverse validation information includes an inverse authentication decision (e.g., 1206M) associated with the first image, wherein the inverse authentication decision contradicts the initial authentication decision (e.g., 1206*a*) that was associated with the first image.

The server (e.g., machine learning module 126) initiates (1306) a subsequent updating (refining) process for the model 136 based on the image data (1204M/1210) and the inverse validation information (1206M) as described with reference to FIG. 12B.

Subsequent to the subsequent updating of the authentication model 136, the server deletes (1312) the requested image data (e.g., 1210) from the data storage of the machine learning system (e.g., memory 102). In some embodiments, deleting the requested image data requires deletion of a first instance of the image from the data storage (e.g., image data 1204*a*), the first instance having been created in response to the initial authorization request (1202*a*), as well as deletion of a second instance of the image from the data storage (e.g., image data 1204M) the second instance having been created in response to the deletion request (1202M). In some embodiments, in addition to deleting the requested image data (e.g., 1210), the server deletes the corresponding validation information (e.g., decision 1206*a* and/or decision 1206M). In some embodiments, the server deletes the corresponding validation information (e.g., decision 1206*a* and/or decision 1206M) as part of a deletion operation including the deletion of the original authorization request (e.g., request 1202*a*, including the image data 1204*a* and decision data 1206*a*) and/or the subsequent deletion-triggered request created during step 1310 (e.g., 1202M, including the image data 1204M and decision data 1206M).

In some embodiments, the user's image has already been deleted from the data storage of the machine learning module 126, perhaps due to having been present in the memory 102 for more than a predetermined amount of time. In some embodiments, the server requests the user to resubmit the image in order to provide a basis for forming the inverse data set (1202M), thereby allowing the model 136 to be purged. In any case, once the model 136 is purged of the image's impression, the image is deleted from the data storage of the machine learning module 126.

In some embodiments, the server transmits deletion confirmation information to the user device, wherein the deletion confirmation information references the first image. For example, the server transmits a message (e.g., to requesting device 154 or user device 156) for display to the user confirming that the user's image has been deleted and/or any impression that was made by the image has been purged from the processing system.

The embodiments described with reference to FIGS. 12A-12B and 20 above provide for not only the deletion of personal data from a data set upon request by a user, but also allow for the purging of any impression, effects, knowledge, and so forth, that may have been left by a data processor's access to that personal data. Further, the embodiments described herein facilitate this purging in a manner that is more efficient (e.g., due to data processors not having to retrain machine learning models from scratch), and more effective (in that not only is the user's data erased, but also any information learned from the user's data) due to the improved machine learning embodiments described herein.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 102 and the memory 202) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 102 and the memory 202 include one or more storage devices remotely located from the CPU(s) 104 and 204. The memory 102 and the memory 202, or alternatively the non-volatile memory device(s) within these memories, comprises a non-transitory computer readable storage medium.

Communication systems as referred to herein (e.g., the communication system 108 and the communication system 208) optionally communicate via wired and/or wireless communication connections. Communication systems optionally communicate with networks (e.g., the networks 150 and 152), such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A computer-implemented method, comprising:
   receiving, from a user device, by an authentication system, a first authentication request for authenticating a first image of a user, wherein the first image is a live-view image of the user;
   receiving, from the user device and for authentication of the first image, a reference identification image of the user, wherein the reference identification image is not a live-view image of the user;
   generating a validation user interface that causes display of the first image and the reference identification image of the user;
   receiving an input at the validation user interface indicative of the reference identification image having at least one predefined image fault; and
   in response to the input indicative of the at least one predefined image fault in the reference identification image:
      rejecting the first authentication request and causing display of a first explanation describing a particular type of image fault determined by a manual review process of the input; and
      updating an authentication model of a machine learning system based on the reference identification image, the at least one predefined image fault, and the first explanation;
      receiving a second authentication request for authenticating a second image of the user and receiving a second reference identification image of the user to authenticate the second image; and
   upon determining that the second reference identification image has the at least one predefined image fault, rejecting the second authentication request and causing display of a second explanation corresponding to rejection of the second authentication request, wherein the second explanation comprises information associated with a type of the predefined image fault, wherein the second explanation is determined using the updated authentication model of the machine learning system, the updated authentication model being independent of the manual review process.

2. The computer-implemented method of claim 1, wherein the predefined image fault is one from a set of predefined image faults consisting of: a digital copy, a manipulated image, a cloned image, a spliced image, an inserted text, a missing text, a punched document, data masking, and a layout irregularity.

3. The computer-implemented method of claim 1, wherein the input at the validation user interface is a human-reviewer input.

4. The computer-implemented method of claim 3, wherein the validation user interface has one or more controls configured to receive the human-reviewer input that is indicative of a human reviewer having detected the at least one predefined image fault of a set of predefined image faults.

5. The computer-implemented method of claim 1, wherein the authentication model determines that the first authentication request is part of a subset of invalid authentication request activity associated with one or more of the group consisting of: reported frauds, predefined image faults, a number of invalid authentication requests exceeding a threshold number of invalid authentication requests, and a rate of fraudulent activity exceeds a threshold level.

6. The computer-implemented method of claim 1, wherein rejecting the first authentication request is further based on determining an invalidity characteristic associated with the first authentication request, the invalidity characteristic including one or more of the group consisting of: an internet protocol (IP) address, geographical area, device type that is no longer available, camera type, document type, transaction type, and a time at which the first authentication request is received.

7. The computer-implemented method of claim 6, wherein the first explanation corresponding to the rejection of the first authentication request includes information about the invalidity characteristic.

8. The computer-implemented method of claim 1, further comprising:
   determining respective weights for each predefined image fault of a set of predefined image faults;
   adjusting the respective weights over time in response to regional activity or transaction types determined to be problematic; and
   re-training the authentication model of the machine learning system based on adjusted respective weights for each predefined image fault of the set of predefined image faults.

9. The computer-implemented method of claim 1, wherein an indication that the predefined image fault is detected is by a selection of at least one of a portion of the reference identification image and a portion of an authentication image.

10. The computer-implemented method of claim 1, wherein the machine learning system is trained based on human-tagged image fault data, unsupervised machine learning, and/or adversarial training.

11. A system comprising one or more processors and memory storing instructions which instructions, when executed by the one or more processors, cause the one or more processors to perform a set of operations, including:
   receiving, from a user device, by an authentication system, a first authentication request for authenticating a first live-view image of a user and a reference identification image of the user that is a not live-view;
   generating a validation user interface that causes display of the first live-view image and the reference identification image of the user;
   receiving an input at the validation user interface indicative of at least one predefined image fault in the reference identification image and in response rejecting the first authentication request and providing a display of a corresponding first explanation determined by manual review of the input and indicative of a type of image fault;
   and
   updating an authentication model of a machine learning system based on the reference identification image, the at least one predefined image fault, and the corresponding first explanation;
      receiving a second authentication request for authenticating a second image of the user and receiving a second reference identification image of the user to authenticate the second image; and
      rejecting the second authentication request upon determining that the second reference identification image has the at least one predefined image fault and causing display of a corresponding second explanation determined by the updated authentication model independent from the manual review, and wherein the second explanation is indicative of a type of the at least one predefined image fault.

12. A non-transitory computer readable storage medium storing instructions, which instructions, when executed by a system that includes one or more processors, cause the one or more processors to perform a set of operations, including:
   receiving, by an authentication system and from a user device, a first authentication request for authenticating a first image of a user, wherein the first image is a live-view image of the user;
   receiving, from the user device and for authentication of the first image, a reference identification image of the user, wherein the reference identification image is not a live-view image of the user;
   generating a validation user interface that causes display of the first image and the reference identification image of the user;
   receiving an input at the validation user interface indicative of the reference identification image having at least one predefined image fault from a set of predefined image faults; and
   in response to the input indicative of the reference identification image having the at least one predefined image fault:
      rejecting the first authentication request based on the at least one predefined image fault;
      causing display of a first explanation corresponding to rejection of the first authentication request, wherein the first explanation comprises information associated with a type of the at least one predefined image fault, wherein the first explanation is determined by a manual review of the input; and
   updating an authentication model of a machine learning system based on the reference identification image, the at least one predefined image fault, and the first explanation;
   receiving a second authentication request for authenticating a second image of the user and receiving a second reference identification image of the user to authenticate the second image; and
   rejecting the second authentication request upon determining that the second reference identification image has the at least one predefined image fault and causing display of a corresponding second explanation determined by the updated authentication model independent from the manual review, and wherein the second explanation is indicative of a type of the at least one predefined image fault.

13. The system according to claim 11, wherein the at least one predefined image fault is at least one from a group consisting of: a digital copy, a manipulated image, a cloned image, a spliced image, an inserted text, a missing text, a punched document, data masking, and layout irregularity.

14. The system according to claim 11, wherein the input at the validation us interface is a human-reviewer input.

15. The system according to claim 14, wherein the validation user interface has one or more controls configured to receive the human-reviewer input that is indicative of a human reviewer having detected the at least one predefined image fault from the set of predefined image faults.

16. The system according to claim 11, wherein the authentication model determines that the first authentication request is part of a subset of invalid authentication request activity associated with at least one from a group consisting of: reported frauds, predefined image faults, a number of invalid authentication requests exceeding a threshold number of invalid authentication requests, and a rate of fraudulent activity exceeds a threshold level.

17. The system according to claim 11, wherein rejecting the first authentication request is further based on determining an invalidity characteristic associated with the first authentication request, the invalidity characteristic including one or more from a group consisting of: an internet protocol (IP) address, geographical area, device type that is no longer available, camera type, document type, transaction type, and a time at which the first authentication request is received.

18. The system according to claim 17, wherein the first explanation corresponding to the rejection of the first authentication request includes information about the invalidity characteristic.

19. The system according to claim 11, further comprising:

determining respective weights for each predefined image fault from a set of predefined image faults consisting of: a digital copy, a manipulated image, a cloned image, a spliced image, an inserted text, a missing text, a punched document, data masking, and layout irregularity;

adjusting the respective weights over time in response to regional activity or transaction types determined to be problematic; and re-training the authentication model of the machine learning system based on adjusted respective weights for each predefined image fault of the set of predefined image faults.

20. The non-transitory computer readable storage medium storing instructions, according to claim 12, which, when executed by a system that includes one or more processors, cause the one or more processors to perform a set of operations, further comprising:

determining respective weights for each predefined image fault from a set of predefined image faults;

adjusting the respective weights over time in response to regional activity or transaction types determined to be problematic; and re-training the authentication model of the machine learning system based on adjusted respective weights for each predefined image fault of the set of predefined image faults.

\* \* \* \* \*